(12) United States Patent
Vanderwater et al.

US011863655B2

(10) Patent No.: US 11,863,655 B2
(45) Date of Patent: *Jan. 2, 2024

(54) METHOD AND SYSTEM FOR RELIABLE APPLICATION LAYER DATA TRANSMISSION THROUGH UNRELIABLE TRANSPORT LAYER CONNECTIONS IN A NETWORK

(71) Applicant: CLOUDFLARE, INC., San Francisco, CA (US)

(72) Inventors: Michael John Vanderwater, Champaign, IL (US); Nicholas Alexander Wondra, Savoy, IL (US)

(73) Assignee: CLOUDFLARE, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/978,782

(22) Filed: Nov. 1, 2022

(65) Prior Publication Data

US 2023/0052895 A1 Feb. 16, 2023

Related U.S. Application Data

(63) Continuation of application No. 16/730,851, filed on Dec. 30, 2019, now Pat. No. 11,489,948.

(51) Int. Cl.
*H04L 69/08* (2022.01)
*H04L 69/329* (2022.01)
(Continued)

(52) U.S. Cl.
CPC ............ *H04L 69/329* (2013.01); *H04L 67/56* (2022.05); *H04L 69/08* (2013.01); *H04L 69/163* (2013.01); *H04W 88/06* (2013.01)

(58) Field of Classification Search
CPC ...... H04W 88/06; H04L 69/329; H04L 69/08; H04L 69/103; H04L 67/56; H04L 69/163
(Continued)

(56) References Cited

U.S. PATENT DOCUMENTS 7,359,933 B1 * 4/2008 Polen .................. H04L 67/34
709/219
7,873,025 B2 1/2011 Patel et al.
(Continued)

FOREIGN PATENT DOCUMENTS

CA 2632648 A1 * 6/2007 ........... A61B 5/0002
CA 2557733 C * 11/2011 ............. H04B 10/27

OTHER PUBLICATIONS

Cloudflare, "What is BGP | BGP Routing Explained", Available online at <https://www.cloudflare.com/learning/security/glossary/what-is-bgp/>, Retrieved on Dec. 2, 2019, pp. 1-5.
(Continued)

*Primary Examiner* — Khanh Q Dinh
(74) *Attorney, Agent, or Firm* — NICHOLSON DE VOS WEBSTER & ELLIOTT LLP

(57) ABSTRACT

A first transport protocol connection is established between a first proxy network element and a second proxy network element. The first proxy network element receives from a first Border Gateway Protocol (BGP) client, first BGP data destined to a second BGP client that is connected to the second proxy network element. The first BGP data is transmitted to the second proxy network element through the first transport protocol connection for delivery to the second BGP client. The first proxy network element receives second BGP data destined to the second BGP client. Responsive to determining that the first transport protocol connection is down, the first proxy network element stores the second BGP data and establishes a second transport protocol connection to the second proxy network element. The second
(Continued)

BGP data is transmitted to the second proxy network element through the second transport protocol connection.

21 Claims, 10 Drawing Sheets

(51) Int. Cl.
    *H04L 69/163*     (2022.01)
    *H04W 88/06*     (2009.01)
    *H04L 67/56*     (2022.01)

(58) Field of Classification Search
    USPC .................................. 709/220, 224, 226, 228
    See application file for complete search history.

(56) References Cited

U.S. PATENT DOCUMENTS

| | | | | |
|---|---|---|---|---|
| 9,374,351 | B1* | 6/2016 | Basha P. R. | H04L 67/1097 |
| 10,374,872 | B2* | 8/2019 | Ratkovic | H04L 67/51 |
| 11,088,900 | B2* | 8/2021 | Ratkovic | H04L 41/0895 |
| 11,489,948 | B2* | 11/2022 | Vanderwater | H04L 69/329 |
| 11,689,413 | B2* | 6/2023 | Ratkovic | H04L 41/0803 709/220 |
| 2003/0120680 | A1* | 6/2003 | Agrawal | H04L 69/329 |
| 2005/0222815 | A1* | 10/2005 | Tolly | H04L 43/50 702/185 |
| 2007/0025358 | A1* | 2/2007 | Beckmann | H04L 65/1045 370/469 |
| 2008/0170501 | A1 | 7/2008 | Patel et al. | |
| 2009/0141634 | A1* | 6/2009 | Rothstein | H04L 47/2483 370/236 |
| 2014/0040457 | A1* | 2/2014 | Agrawal | H04L 47/40 709/227 |
| 2016/0100023 | A1* | 4/2016 | Kim | H04L 67/56 709/227 |
| 2017/0346084 | A1* | 11/2017 | Sakshaug | H01M 4/362 |
| 2018/0131593 | A1 | 5/2018 | Jain et al. | |
| 2018/0376317 | A1* | 12/2018 | Kim | H04L 69/24 |
| 2019/0306015 | A1* | 10/2019 | Ratkovic | H04L 67/51 |
| 2021/0160163 | A1 | 5/2021 | Gray | |
| 2021/0203763 | A1* | 7/2021 | Vanderwater | H04L 67/565 |
| 2021/0266748 | A1* | 8/2021 | Wei | H04W 12/69 |
| 2021/0367837 | A1* | 11/2021 | Ratkovic | H04L 41/122 |

OTHER PUBLICATIONS

Lougheed et al., "A Border Gateway Protocol (BGP)", Network Working Group, Request for Comments: 1105, Jun. 1989, pp. 1-17.
Non-Final Office Action, U.S. Appl. No. 16/730,851, dated Apr. 15, 2022, 10 pages.
Notice of Allowance and Fees Due (PTOL-85) dated Jan. 8, 2021 for U.S. Appl. No. 16/730,851.
Notice of Allowance, U.S. Appl. No. 16/730,851, dated Aug. 8, 2022, 8 pages.
Wikipedia, "Application Layer", Available online at <https://en.wikipedia.org/wiki/Application_layer>, Retrieved on Dec. 2, 2019, pp. 1-3.
Wikipedia, "Border Gateway Protocol", Available online at <https://en.wikipedia.org/wiki/Border_Gateway_Protocol>, Retrieved on Dec. 2, 2019, pp. 1-15.
Wikipedia, "Proxy server", Available online at <https://en.wikipedia.org/wiki/Proxy_server>, Retrieved on Dec. 2, 2019, pp. 1-13.
Wikipedia, "Transmission Control Protocol", Available online at <https://en.wikipedia.org/wiki/Transmission_Control_Protocol>, Retrieved on Dec. 2, 2019, pp. 1-13.

* cited by examiner

ESTABLISH A FIRST TRANSPORT PROTOCOL CONNECTION TOWARDS THE SECOND NETWORK ELEMENT 301

WHERE THE FIRST PROXY NETWORK ELEMENT IS A DIRECT PROXY AND WHERE TO ESTABLISH THE FIRST TRANSPORT PROTOCOL CONNECTION IS PERFORMED BETWEEN THE FIRST NETWORK ELEMENT AND THE FIRST PROXY NETWORK ELEMENT WITH THE IP ADDRESS OF THE FIRST NETWORK ELEMENT AND THE IP ADDRESS OF THE FIRST PROXY NETWORK ELEMENT
332

WHERE THE FIRST PROXY NETWORK ELEMENT IS A TRANSPARENT PROXY AND WHERE TO ESTABLISH THE FIRST TRANSPORT PROTOCOL CONNECTION IS PERFORMED WITH THE IP ADDRESS OF THE FIRST NETWORK ELEMENT AND THE IP ADDRESS OF THE SECOND NETWORK ELEMENT
334

FIG. 3B

ESTABLISH THE SECOND TRANSPORT PROTOCOL CONNECTION TOWARDS THE SECOND NETWORK ELEMENT 306

WHERE THE SECOND PROXY NETWORK ELEMENT IS A DIRECT PROXY AND WHERE TO ESTABLISH THE SECOND TRANSPORT PROTOCOL CONNECTION IS PERFORMED BETWEEN THE FIRST PROXY NETWORK ELEMENT AND THE SECOND PROXY NETWORK ELEMENT WITH THE IP ADDRESS OF THE FIRST PROXY NETWORK ELEMENT AND THE IP ADDRESS OF THE SECOND PROXY NETWORK ELEMENT
336

WHERE THE SECOND PROXY NETWORK ELEMENT IS A TRANSPARENT PROXY AND WHERE TO ESTABLISH THE SECOND TRANSPORT PROTOCOL CONNECTION IS PERFORMED WITH THE IP ADDRESS OF THE FIRST PROXY NETWORK ELEMENT AND THE IP ADDRESS OF THE SECOND NETWORK ELEMENT
338

FIG. 3C

METHOD AND SYSTEM FOR RELIABLE APPLICATION LAYER DATA TRANSMISSION THROUGH UNRELIABLE TRANSPORT LAYER CONNECTIONS IN A NETWORK

CROSS-REFERENCE TO RELATED APPLICATIONS

This application is a continuation of U.S. application Ser. No. 16/730,851 filed Dec. 30, 2019, now issued as U.S. Pat. No. 11,489,948 B2, which is hereby incorporated by reference.

TECHNICAL FIELD

Embodiments of the invention relate to the field of network computing; and more specifically, to a method and a system for reliable application layer data transmission through unreliable transport layer connections in a network.

BACKGROUND

An application layer is an abstraction layer that specifies shared communications protocols and interface methods used by the network elements to exchange data in a communications network. The application layer is the layer where application clients run. Application layer clients can be a web browser, an e-mail client, a telnet client, an ftp client, a routing protocol client, or other client applications that run at the application layer. Several application layer protocols can be used by the application layer client, e.g., HTTP, File Transfer Protocol (FTP), SMTP, BGP, etc.

Application layer clients rely on transport layer protocols to communicate application layer data to and from one another. The transport layer protocol establishes the host-to-host data transfer connections and manages the data exchange between the application layer clients. Some application layer clients store states and data information related to a communication with another application layer client. This data is tied to the transport layer connection that is established between the network elements that include the application layer clients. These application layer clients are dependent on the status of the transport layer protocol. For example, a Transport Control Protocol (TCP) connection may be associated with a Border Gateway Protocol (BGP) session between two BGP clients. When the TCP connection fails due to a failure in the network that transports the TCP packets, that causes failure of the BGP session. Thus, application layer data transmission can be interrupted due to a network issue and independent of the application layer clients. In that case, the application layer data can be lost (e.g., BGP states of the BGP session, and/or routing tables of the BGP session). This may cause the application layer clients to need to reestablish the transport layer connection for retransmitting application layer data and may require the recreation of one or more states associated with the application layer communication between the two clients.

BRIEF DESCRIPTION OF THE DRAWINGS

The invention may best be understood by referring to the following description and accompanying drawings that are used to illustrate embodiments of the invention. In the drawings:

FIG. 3B illustrates a flow diagram of exemplary operations performed for establishing a first transport protocol connection towards the second network element according to some embodiments.

FIG. 3C illustrates a flow diagram of exemplary operations performed for establishing the second transport protocol connection towards the second network element according to some embodiments.

DETAILED DESCRIPTION

Figure 1:
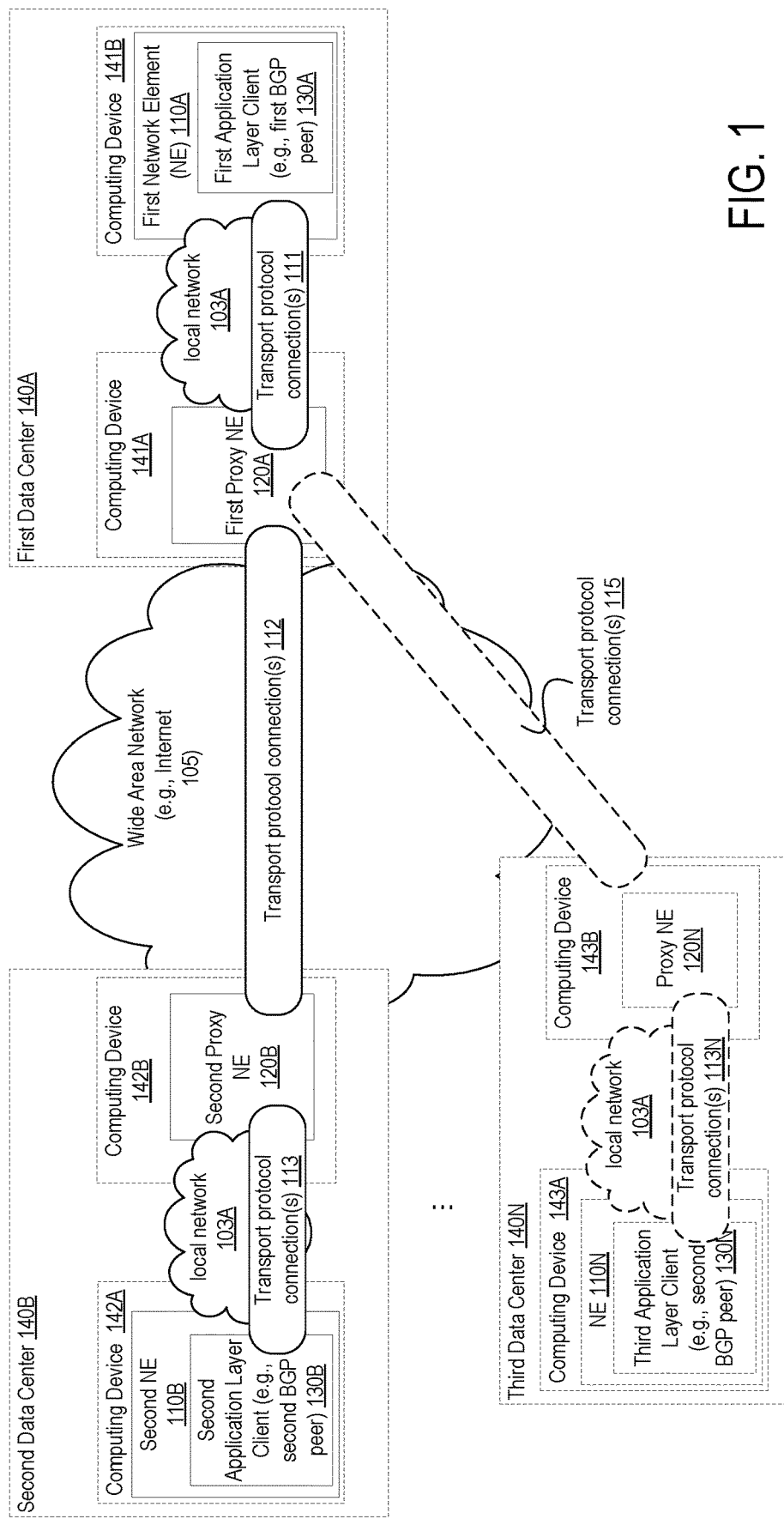
FIG. 1 illustrates a block diagram of a system for enabling reliable application layer data transmission through an unreliable transport layer connection in a network according to some embodiments.

The following description describes methods and apparatus for reliable application layer data transmission through unreliable transport layer connections in a network. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Method and network elements for enabling reliable application layer data transmission through an unreliable transport layer connections in a network are described. The embodiments described herein may be implemented in a proxy network element. The proxy network element receives from a first network element through a first transport protocol connection first application layer data that is destined to a second network element remote from the first network element. The proxy network element transmits the first application layer data through a second transport protocol connection towards the second network element, where the second transport protocol connection is different from the first transport protocol connection. The proxy network element receives from the first network element through the first transport protocol connection second application layer data that is destined to the second network element. Responsive to determining that there are no transport protocol connections for transmitting the second application layer date, the proxy network element stores the second application layer data in the first proxy network element. Responsive to determining that a third transport protocol connection is established towards the second network element, the proxy network element transmits the second application layer data through the third transport protocol connection towards the second network element.

The embodiments described herein enable a higher-level network layer client (e.g., application layer client 130B) to maintain communication with another client (e.g., another application layer client 130A) even when a transport protocol connection is lost between proxy NEs. Maintaining the communication at the application layer, even when the transport layer fails, saves bandwidth in the network by avoiding unnecessary retransmission of application layer data through the network.

FIG. 1 illustrates a block diagram of a system 100 for enabling reliable application layer data transmission through unreliable transport layer connections in a network according to some embodiments. The system 100 includes a first network element (NE) 110A, a first proxy NE 120A, a second proxy NE 120B, and a second NE 110B. Each one of the first NE 110A, the first proxy NE 120A, the second proxy NE 120B, and the second NE 110B are operative to support transport and packet protocols for transporting data through the networks 103A, 105, and 103B.

The transport protocol can be TCP or another transport protocol that enables connection-oriented communication over Internet Protocol (IP) networks between two endpoints. Another example of such a protocol can be Quick UDP Internet Connections (QUIC). TCP is transport protocol that exists at Layer 4, and may rely on a connectionless packet switching network layer protocol such as IP, where different packets may be routed over different paths, and thus be delivered out of order. TCP enables a reliable virtual circuit to be established on top of the underlying unreliable and connectionless IP protocol. The virtual circuit that is enabled with a TCP connection is identified by the source and destination network socket address pair, i.e. the sender and receiver IP address and port number. The virtual circuit is possible since TCP includes segment numbering and reordering on the receiver side to prevent out-of-order delivery. Thus, TCP is encapsulated within the data field of IP datagrams and TCP encapsulates higher level protocol data such as HTTP (web), SMTP (email), routing protocols (such as BGP), and many other protocols.

The first NE 110A and the second NE 110B include a first application layer client 130A and a second application layer client 130B respectively. The first and second application layer clients 130A-B are configured to run an application layer protocol for exchanging protocol layer data between one another. In the following description, the application layer is an abstraction layer that specifies the shared communications protocols and interface methods used by the network elements 110A and 110B to exchange data in a communications network (here the communication network formed by the networks 103A, 105, and 103B). The application layer is a network layer that is higher than the transport layer protocol, where the transport layer establishes the host-to-host data transfer connections and manages the data exchange between the network elements. Each one of the first application layer clients 130A-130B can be a web browser, an e-mail client, a telnet client, an ftp client, a routing protocol client, or other client applications. Several application layer protocols can be used by the application layer client, e.g., HTTP, File Transfer Protocol (FTP), SMTP, BGP, etc. In some embodiments, the first and second application layer clients 130A-B can be a first and second BGP peers respectively that enable BGP communication.

The first NE 110A is coupled to the first proxy NE 120A through a reliable network, e.g., local network 103A. The first NE 110A and the first proxy NE 120A are operative to establish transport protocol connection(s) 111 to transport the first application layer data generated by the first application layer client 130A of NE 110A. In some embodiments, the NE 110A and the first proxy NE 120A are part of a same data center, e.g., first data center 140A. In some embodiments, the first NE 110A and the first proxy NE 120A can be part of a local area network that is confined within a limited area (such as a residence, a school, a university campus, a factory, a Point of Presence (PoP) of a cloud-based proxy service. A POP is a collection of networking equipment (e.g., authoritative name servers and proxy servers) that are geographically distributed to decrease the distance between requesting client devices and requests destination. The cloud-based proxy service may include one or more proxy servers (that can be part of multiple POPs), where each proxy server includes a cache for returning network resources, as well as providing other services (e.g., protecting against Internet-based threats (e.g., proactively stopping botnets, cleaning viruses, trojans, and worms, etc.), performance services (e.g., acting as a node in a CDN and dynamically caching customer's files closer to clients, page acceleration, etc.), and/or other services). In some embodiments, the first NE 110A can be a proxy server of the cloud-based proxy service offering application layer services to one or more customers (not shown in FIG. 1A). In these embodiments, the first proxy NE 120A is another server in the cloud-based proxy service that is located at the same premises as the first NE 110A and is operative to provide Layer 2 and Layer 3 network services to the first NE 110A. In some implementations, the first NE 110A and the first proxy NE 120A can be implemented on separate computing devices, e.g., computing device 141A, and computing device 141B respectively. In other implementations, the first NE 110A and the proxy NE 120A can be virtual network elements that are implemented on the same computing device.

The first NE 110A and the first proxy NE 120A are operative to establish one or more transport protocol connection(s) 111. The transport protocol connections 111 are used to carry application layer data that is generated by the first application layer client 130A of the first NE 110A and that is destined to the second application layer client 130B of the second NE 110B. The transport protocol connections 111 further carry application layer data that was generated by the second application layer client 130B of the second NE 110B and that is destined to the first application layer client 130A of the first NE 110A. The first proxy NE 120A is operative to receive data through the transport protocol connection(s) 111 and transmit this data through a different protocol connection, transport protocol connection(s) 112, towards the second NE 110B and through the second proxy NE 120B.

The second NE 110B is coupled to the second proxy NE 120B through a reliable network, e.g., local network 103B. In some embodiments, the NE 110B and the first proxy NE 120B are part of a same data center, e.g., second data center 140B. In some embodiments, the second NE 110B and the second proxy NE 120B can be part of a local area network that is confined within a limited area (such as a residence, a school, a university campus, a factory, a PoP of the cloud-based proxy service. In some embodiments, the second NE 110B can be a proxy server of the cloud-based proxy service offering application layer services to one or more customers (not shown in FIG. 1A). In these embodiments, the second proxy NE 120B is another server in the cloud-based proxy service that is located at the same premises as the second NE 110B and is operative to provide Layer 2 and Layer 3 network services to the second NE 110B. In some implementations, the second NE 110B and the second proxy NE 120B can be implemented on separate computing devices, e.g., computing device 142A, and computing device 142B respectively. In other implementations, the second NE 110B and the proxy NE 120B can be virtual network elements that are implemented on the same computing device.

The second NE 110B and the second proxy NE 120B are operative to establish one or more transport protocol connection(s) 113. The transport protocol connections 113 carry application layer data that was generated by the first application layer client 130A of the first NE 110A, that is received from through the connections 112, and that is destined to the second application layer client 130B of the second NE 110B. The transport protocol connections 113 further carry application layer data that is generated by the second application layer client 130B of the second NE 110B and that is intended to be received by the first application layer client 130A of the first NE 110A. The second proxy NE 120B is operative to receive data through the transport protocol connection(s) 113 and transmit this data through a different protocol connection, transport protocol connection(s) 112, towards the first NE 110A and through the first proxy NE 120A.

The first proxy NE 120A and the second proxy NE 120B are coupled through a wide area network (e.g., internet) that may be unreliable and can be subject to failure causing the loss of connections between the first and the second proxy NEs. The first proxy NE 120A and the second proxy NE 120B are operative to establish transport protocol connection(s) 112. Each transport protocol connection 112 can be subject to disconnection due to unreliability of the network 105.

In the embodiments described, establishing a transport protocol connection may include performing a handshake mechanism between a network element and another network element. The handshake mechanism involves the exchange of one or more transport layer messages between the network element and the other network element (e.g., between the first NE 110A and the first proxy NE 120A, between the first proxy NE 120A and the second proxy 120B, and between the second proxy NE 120B and the second NE 110B). When the transport protocol is TCP, the handshake mechanism can be referred to as TCP handshake or three-way handshake (SYN_SYN_ACK). The TCP handshake may include the network element (e.g., first NE 110A, first proxy NE 120A, second proxy NE 120B, or second NE 110B) sending a TCP synchronize (SYN) packet to the other network element (e.g., first proxy NE 120A, first NE 110A, second proxy NE 120B, or second NE 110B). As part of the TCP handshake, the other network element receives the SYN packet, and sends a synchronize-acknowledgement (SYN-ACK) packet to the network element. The network element receives the SYN-ACK packet and sends the acknowledge (ACK) packet to the other network element. Upon receipt of the ACK message by the other network element, the TCP connection (sometimes referred to as the TCP socket connection) is established.

To transmit application layer data between the first NE 110A and the second NE 110B, instead of establishing a direct transport protocol connection between NE 110A and NE 110B, the system 100 is operative to use the transport protocol connection 111 between the first NE 110A and the proxy NE 120A, the transport protocol connection 112 between the proxy NE 120A and the proxy NE 120B, and the transport protocol connection 113 between the second proxy NE 120B and the second NE 110B. For example, the first NE 110A transmits application layer data through the transport protocol connection 111. The first proxy NE 120A receives, from the first NE 110A and through the first transport protocol connection 111, the application layer data that is destined to the second NE 110B. The second NE 110B is remote from the first NE 110A. The proxy NE 120A transmits the application layer data through the second transport protocol connection 112 towards the second network element. In some embodiments, upon receipt from the first NE 110A and through the first transport protocol connection 111 of the application layer data, the proxy NE 120A may determine that there are no transport protocol connections with the proxy NE 120B (e.g., that connection 112 is down). In response to determining that the transport protocol connection 112 is down, the proxy NE 120A stores the second application layer data in the first proxy NE 120A. The proxy NE 120A reestablishes a connection 112 and responsive to determining that the transport protocol connection 112 is established towards the second NE 110B, the proxy NE 120A transmits the stored application layer data through the transport protocol connection 112 towards the second NE 110B.

The proxy NE 120A and proxy NE 120B act as transport protocol proxies between the two application layer clients 130A-B of NEs 110A-B. These transport protocol proxies are configured to tolerate dropped transport protocol connections between them while maintaining the outer transport protocol connections with the NEs 110A-B respectively. Thus, the application layer clients 130A-B have long-lived transport protocol connections over a reliable network link (here 103A and 103B), that is bridged by the transport protocol connection between the two proxy NEs 120A-B. This offers reconnection of the transport protocol connection 112 in the event of an unexpected outage or failure without any impact on the application layer communication. Thus, when the connection 112 through the network 105 is lost for reasons that are independent from the execution of the application layer protocol at the NE 110A or at the NE 110B, the application layer communication between the two application layer clients is not affected.

In some embodiments, the transport protocol is TCP and the application layer protocol is BGP. In these embodiments, a BGP session runs between the first NE 110A and the second NE 110B (between client 130A (first BGP peer) and client 130B (second BGP peer)). Each one of the first NE 110A and the second NE 110B have BGP states associated with the session and also associated with each respective TCP connection associated with the BGP session. For example, the NE 110A has a BGP session and states associated with the TCP connection 111 and the NE 110B has the BGP session and states associated with a different TCP connection 113. As the BGP session between client 130A and client 130B is not directly tied to the TCP connection 112 and each one of the first proxy NE 120A and the second proxy NE 120B stores any BGP messages received from the first NE 110A or the second NE 110B, loss of the TCP connection 112 does not affect the BGP session. In this example, when the TCP connection is lost, the proxy NEs 120A-B are operative to reestablish that connection to transmit the stored BGP message. Thus, a temporary loss of the connection 112 does not cause BGP messages to be lost and the BGP session to be terminated. While the embodiments herein are described with respect to operations performed at the first proxy NE 120A, similar operations are performed by the proxy NE 120B for processing data to/from the second NE 110B.

The embodiments described herein enable a higher-level network layer client (e.g., application layer client 130B) to maintain communication with another client (e.g., another application layer client 130A) even when a transport protocol connection is lost between proxy NEs. For example, when the application layer is BGP, a BGP session can be maintained for a period of time even if an inner TCP connection (in the network 105) is lost. The use of the first proxy NE 120A and the second proxy NE 120B to separate the BGP sessions from the TCP connection that traverses the unreliable network allows each one of the BGP peers to link the BGP session with a reliable TCP connection (e.g., the TCP connection in the network 103A and the TCP session in the network 103B). This has the advantage of avoiding any state loss, or avoiding the need for retransmitting the BGP routing information from one peer to another, when the connection loss is temporary in the network 105.

In some embodiments, the proxy NE 120A may further allow the NE 110A to communicate with one or more additional application layer clients, e.g., application layer client 130N. The first application layer client 130A and the third application layer client 130N establish a second application layer communication session (e.g., a second BGP session). The application layer data of this second session is transported through another TCP connection between the first NE 110A and the first proxy NE 120A, a different TCP connection between the first proxy NE 120A and the second proxy NE 120B, and another TCP connection between the second proxy NE 120B and the second NE 110B.

Figure 2A:
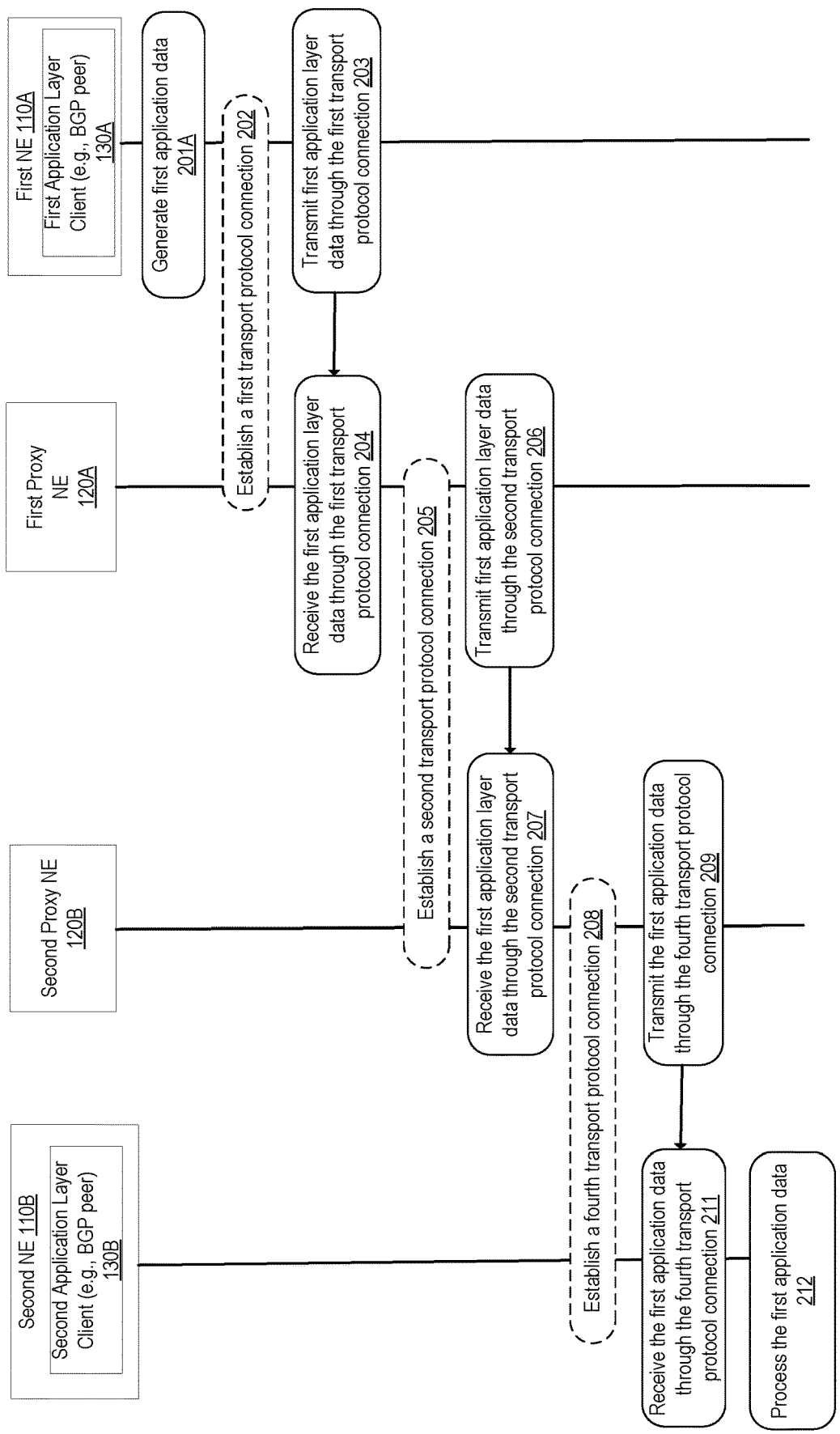
FIG. 2A illustrates a block diagram of operations for transmitting application layer data through transport protocol proxies according to some embodiments.

FIG. 2A illustrates a block diagram of operations for transmitting application layer data through transport protocol proxies according to some embodiments. At operation 201A, the first NE 110A generates first application layer data. The first application layer data is generated by a first application layer client (e.g., BGP peer). In some embodiments, the first application layer data can be a network resource (e.g., XML, HTML, image, media file, etc.). In some embodiments, the first application layer data can be a BGP message (which can also be referred to as a BGP packet). For example, the first application layer data can be an OPEN, UPDATE, NOTIFICATION, or KEEPALIVE message of the BGP protocol. The OPEN message is used to establish a BGP adjacency. Both BGP peers (application layer client 130A-B) negotiate session capabilities before a BGP peering establishes. The OPEN message contains a BGP version number, Autonomous System Number (ASN) of the originating NE (e.g., NE 110A), a Hold Time, a BGP Identifier, and other optional parameters that establish the session capabilities. The UPDATE message is used to advertise any feasible routes, withdraws previously advertised routes, or both. The UPDATE message includes the Network Layer Reachability Information (NLRI) that includes the prefix and associated BGP Policy Accounting (PAs) when advertising prefixes. In some embodiments, an UPDATE message can act as a Keepalive to reduce unnecessary traffic. In some embodiments, KEEPALIVE messages are exchanged every one-third of the Hold Timer agreed upon between the two BGP peers. For example, a Hold Time can be 180 seconds, so the default Keepalive interval is 60 seconds. A NOTIFICATION message is sent when an error is detected with the BGP session, such as a hold timer expiring, neighbor capabilities change, or a BGP session reset is requested. This message causes the BGP connection to close.

The first NE 110A is configured to establish the first transport protocol connection 202 towards the first proxy NE 120A. The application layer client 130A is operative to transmit the application layer data through the first transport connection 202. While the second NE 110B includes the second application layer client 130B that is the destination of the application layer data generated by the client 130A, the NE 110A establishes the transport protocol connection for transmitting this application layer data with the first proxy NE 120A instead of establishing the transport protocol connection with the second NE 110B. Thus the application layer communication (e.g., application layer session) is associated with the first transport connection. The application layer communication is not linked to a transport protocol connection that is established directly between the first NE 110A and the second NE 110B. In some embodiments, establishing a transport protocol connection may include the exchange of one or more transport protocol messages or packets between NE 110A and proxy NE 120A. In some embodiments, the establishment of the transport protocol can be referred to as a handshake mechanism.

In some embodiments, the proxy NE 120A can be a direct (or explicit) proxy or a transparent proxy for the NE 110A. When the proxy NE 120A is a direct proxy, the transport connection between NE 110A and proxy NE 120A is established with the IP address of NE 110A and the IP address of proxy NE 120A. In these embodiments, the NE 110A is configured to transmit all application layer data to the proxy NE 120A. In some embodiments, when the NE 110A is operative to communicate application layer data to multiple remote application layer clients (e.g., client 130B and 130N), the NE 110A may transmit all of the application layer data destined to each one of these multiple application layer clients to the same proxy NE 120A through respective transport protocol connections. In other embodiments, the proxy NE 120A is a transparent proxy and NE 110A is unaware that application layer data is intercepted by this proxy instead of being transmitted to NE 110B. In this embodiment, the transport protocol connection is established with the IP address of the NE 110A and the IP address of the NE 110B. However, instead of being transmitted to the NE 110B through a direct transport protocol connection, the application layer data is sent to the first proxy NE 120A, where it is unpacked and transmitted through a different transport protocol connection as it will be discussed in further details below.

In some embodiments, the transport protocol is TCP and the application layer clients are BGP peers. In these embodiments, at NE 110A the BGP session between client 130A and 130B is associated with the TCP connection between NE 110A and proxy NE 120A instead of being associated with a TCP connection between NE 110A and NE 110B. In some embodiments, the proxy NE 120A is a direct proxy and the TCP connection between NE 110A and proxy NE 120A is established with the IP address of NE 110A and the IP address of proxy NE 120A. In these embodiments, the proxy NE 120A acts as a direct proxy for the NE 110A. In other embodiments, the proxy NE 120A is a transparent proxy and NE 110A is unaware that application layer data is intercepted by this proxy instead of being transmitted to NE 110B directly. In this embodiment, the TCP connection is established with the IP address of the NE 110A and the IP address of the NE 110B. However, instead of being used to transmit the application layer data from NE 110A to NE 110B, the TCP connection is used to send the BGP messages to the first proxy NE 120A through the first TCP connection, where they are unpacked and transmitted through a different TCP connection as it will be discussed in further details below.

The application layer client 130A may keep session data and/or other types of data related to the communication between the client 130B and the client 130A. For example, when the clients 130A-B are BGP peers, each one may store session state related to the BGP session established between the two peers as well as BGP routing tables.

In some embodiments, upon generation of the first application layer data, at operation 201A, the NE 110A may establish the first transport protocol connection at operation 202. In other embodiments, the first transport protocol connection may already have been established for transmitting the application layer data. For example, a first TCP connection may have already been established for a given BGP session, and the generation of a new BGP message for that BGP session causes the transmission of the BGP message through the existing first TCP connection. Alternatively, when the BGP message is an initial message of a new BGP session, the NE 110A may establish the first TCP session at operation 202.

At operation 203, the first NE 110A transmits the first application data through the first transport protocol connection. The first proxy NE 120A receives, at operation 204, from the first NE 110A, through the first transport protocol connection, the first application layer data. The first application layer data is destined to the second NE 110B that is remote from the first network element. The proxy NE 120A is the endpoint of the first transport protocol connection.

In some embodiments, upon receipt of the first application layer data, at operation 204, the proxy NE 120A may establish the second transport protocol connection at operation 205. In other embodiments, the second transport protocol connection may already have been established for transmitting the application layer data from the first proxy NE 120A to the second proxy NE 120B. The second transport protocol connection is different from the first transport protocol connection. For example, when the transport protocol is TCP, a second TCP connection may have already been established for a given BGP session, and the receipt of a new BGP message for that session, through the first TCP connection, causes the transmission of the BGP message through the existing second TCP connection. Alternatively, is the second TCP connection has not been established for the BGP session, the proxy NE 120A may establish the second TCP session at operation 205.

In some embodiments, the establishment of the second transport protocol connection can be performed through a handshake mechanism. In some embodiments, the proxy NE 120B can be a direct (or explicit) proxy or a transparent proxy for the NE 110B. When the proxy NE 120B is a direct proxy, the second transport connection between the proxy NE 120A and proxy NE 120B is established with the IP address of proxy NE 120A and the IP address of proxy NE 120B. In these embodiments, the proxy NE 120A is configured to transmit all application layer data received from the NE 110A to the proxy NE 120B. In some embodiments, when the NE 110A is operative to communicate application layer data to multiple remote application layer clients (e.g., client 130B and 130N), the proxy NE 120A may establish multiple transport connections to each one of the associated proxies of these application layer clients. In other embodiments, the proxy NE 120B is a transparent proxy and NE 110B is unaware that application layer data is intercepted by this proxy instead of being transmitted to NE 110A. In this embodiment, the second transport protocol connection is established with the IP address of the proxy NE 120A and the IP address of the NE 110B. However, instead of being transmitted to the NE 110B through a direct transport protocol connection from proxy NE 120A to NE 110B, the application layer data is sent to the second proxy NE 120B.

At operation 206, the first proxy NE 120A transmits the first application data through the second transport protocol connection. The proxy NE 120A unpacks the transport layer packets received through the first transport protocol connection to retrieve their payloads. The payloads of the transport layer data includes the first application layer data. The first application layer data is then encapsulated in new transport protocol packets to be transmitted, at operation 206, through the second transport protocol connection towards the second NE 110B.

The second proxy NE 120B receives, at operation 207, from the first proxy NE 120A, through the second transport protocol connection, the first application layer data. The proxy NE 120B is the endpoint of the second transport protocol connection. The proxy NE 120B retrieves the first application layer data from transport protocol packets. The transport protocol packets were received through the second transport protocol connection between the first proxy NE 120A and the second proxy NE 120B. The proxy NE 120B determines that the application layer data is to be transmitted through a fourth transport protocol connection towards the second NE 110B. This determination can be performed based on routing table entries for the IP address of the first proxy NE 120A. The proxy NE 120B encapsulates the application layer data in a transport protocol packet and transmits, at operation 209, this packet through the fourth transport protocol connection towards the second NE 110B. The fourth transport protocol connection is different from the second transport protocol connection.

In some embodiments, upon receipt of the first application layer data, at operation 209, the proxy NE 120B may establish the fourth transport protocol connection at operation 208. In other embodiments, the fourth transport protocol connection may already have been established for transmitting the application layer data. For example, when the transport protocol is TCP, a fourth TCP connection may have already been established for a given BGP session, and the receipt of a new BGP message for that session, through the second TCP connection, causes the transmission of the BGP message through the existing fourth TCP connection. Alternatively, when the BGP message is an initial message of a new BGP session, the proxy NE 120B may establish the fourth TCP session at operation 208.

The second NE 110B is the endpoint of the fourth transport protocol connection (e.g., the fourth TCP connection). Upon receipt of transport protocol packet(s) that include the first application data through the fourth transport protocol connection at operation 211, the second NE 110B processes, at operation 212, the first application data at the application protocol layer client 130B. The receipt of the first application layer data may update a state or data of the first application layer protocol client. For example, when the client 130B is a BGP peer, the first application data received can update a state of the BGP session between peer 130A and peer 130B and/or update BGP routing tables stored at the NE 110B.

Figure 2B:
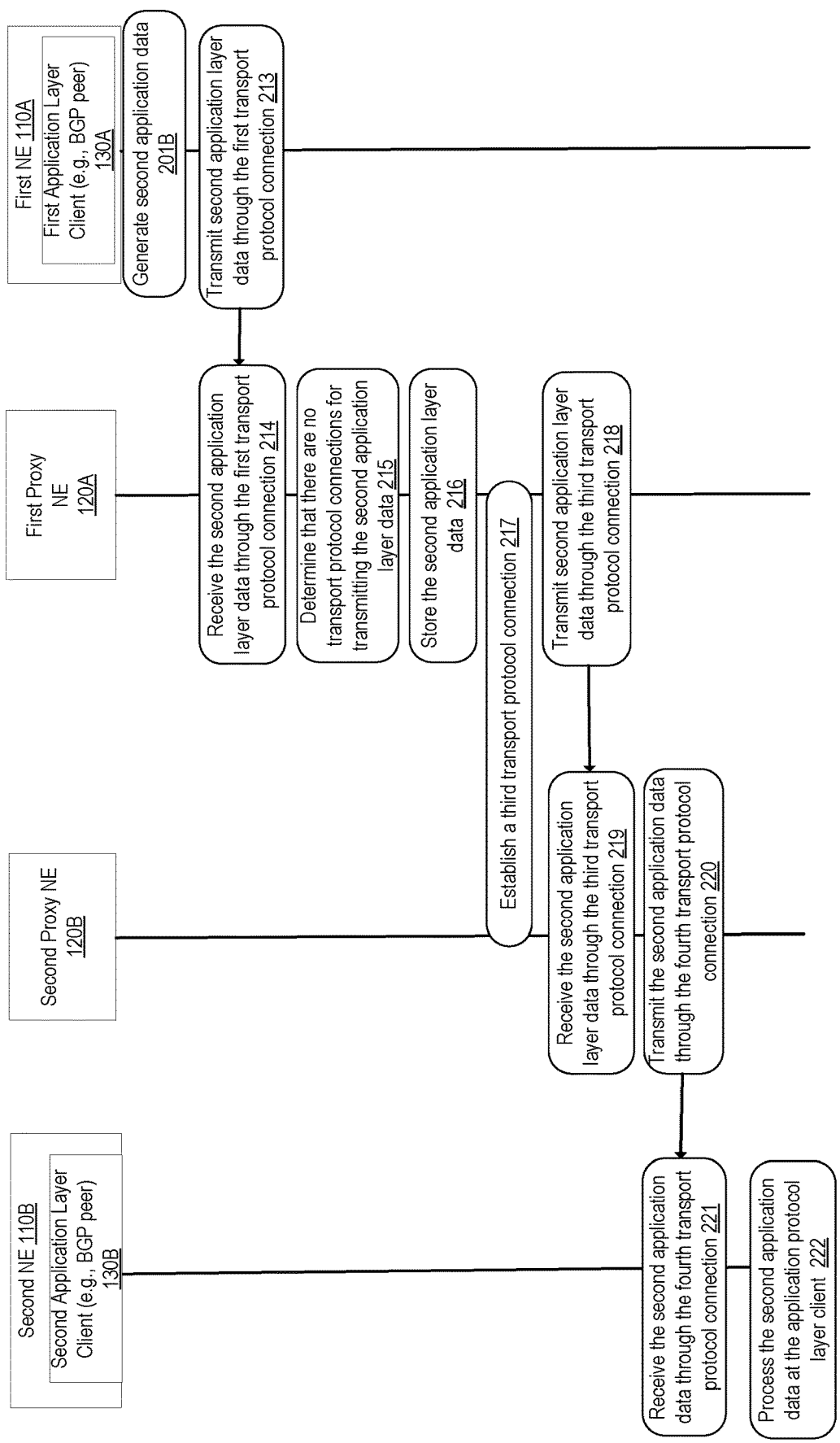
FIG. 2B illustrates a block diagram of operations for transmitting application layer data through transport protocol proxies according to some embodiments.

FIG. 2B illustrates a block diagram of operations for transmitting application layer data through transport protocol proxies according to some embodiments.

At operation 201B, the first NE 110A generates second application layer data. The second application layer data is generated by the first application layer client (e.g., BGP peer). In some embodiments, the second application layer data can be part of an application layer session established between the first application layer protocol clients 130A-B. In some embodiments, the second application layer data can be a BGP message (which can also be referred to as a BGP packet). For example, the first application layer data can be an OPEN, UPDATE, NOTIFICATION, or KEEPALIVE message of the BGP protocol. The BGP message can be part of the same BGP session as the first application data generated at operation 201A.

The application layer client 130A is operative to transmit, at operation 213, the second application layer data through the first transport protocol connection (that was established at operation 202). The application layer client 130A may keep session data and/or other types of data related to the communication between the client 130B and the client 130A. For example, when the clients 130A-B are BGP peers, each one may store session state related to the BGP session established between the two peers as well as BGP routing tables.

At operation 213, the first NE 110A transmits the second application data through the first transport protocol connection. The first proxy NE 120A receives, at operation 214, from the first NE 110A, through the first transport protocol connection, the second application layer data. The second application layer data is received within the transport protocol packets of the first transport protocol connection. The second application layer data is destined to the second NE 110B that is remote from the first network element.

At operation 215, the first proxy NE 120A determines that there are no transport protocol connections established for transmitting the second application layer data. For example, the second transport protocol connection may have been lost (due to failure in the network 105). Upon determining that there are no connections, the proxy NE 120A stores, at operation 216, the second application layer data. Instead of terminating the transport protocol connection established with NE 110A, which would cause the application layer session to be terminated, the proxy NE 120A buffers the second application layer data received to be transmitted through another transport protocol connection towards the NE 110B.

At operation 217, the first proxy NE 120A establishes a third transport protocol connection (e.g., TCP connection) with the proxy NE 120B. In some embodiments, the establishment of the third transport protocol connection can be performed through a handshake mechanism. In some embodiments, the proxy NE 120B can be a direct (or explicit) proxy or a transparent proxy for the NE 110B. When the proxy NE 120B is a direct proxy, the third transport connection between the proxy NE 120A and proxy NE 120B is established with the IP address of proxy NE 120A and the IP address of proxy NE 120B. In these embodiments, the proxy NE 120A is configured to transmit all application layer data received from the NE 110A to the proxy NE 120B. In some embodiments, when the NE 110A is operative to communicate application layer data to multiple remote application layer clients (e.g., client 130B and 130N), the proxy NE 120A may establish multiple transport connections to each one of the associated proxies of these application layer clients. In other embodiments, the proxy NE 120B is a transparent proxy and NE 110B is unaware that application layer data is intercepted by this proxy instead of being transmitted to NE 110A. In this embodiment, the third transport protocol connection is established with the IP address of the proxy NE 120A and the IP address of the NE 110B. However, instead of being transmitted to the NE 110B through a direct transport protocol connection from proxy NE 120A to NE 110B, the application layer data is sent to the second proxy NE 120B.

At operation 218, the first proxy NE 120A transmits the second application data through the third transport protocol connection. The proxy NE 120A unpacks the transport layer packets received through the first transport protocol connection to retrieve their payloads. The payloads of the transport layer data includes the second application layer data. The second application layer data is then encapsulated in new transport protocol packets to be transmitted, at operation 218, through the third transport protocol connection towards the second NE 110B. In some embodiments, the second application layer data is stored at operation 216 after decapsulation of the transport protocol packets received through the first transport protocol layer. In other embodiments, the transport protocol packets received are stored as is and the decapsulation and re-encapsulation of the second application layer packets is performed after the storing operation when the third connection is established.

The second proxy NE 120B receives, at operation 219, from the first proxy NE 120A, through the third transport protocol connection, the second application layer data. The proxy NE 120B is the endpoint of the third transport protocol connection. The proxy NE 120B retrieves the second application layer data from transport protocol packets. The transport protocol packets were received through the second transport protocol connection between the first proxy NE 120A and the second proxy NE 120B. The proxy NE 120B determines that the second application layer data is to be transmitted through the fourth transport protocol connection towards the second NE 110B. This determination can be performed based on routing table entries for the IP address of the first proxy NE 120A. The proxy NE 120B encapsulates the second application layer data in transport protocol packets and transmits, at operation 220, these packet through the fourth transport protocol connection towards the second NE 110B. The fourth transport protocol connection is different from the second transport protocol connection.

The second NE 110B is the endpoint of the fourth transport protocol connection (e.g., the fourth TCP connection). Upon receipt of the transport protocol packet(s) that include the second application data through the fourth transport protocol connection at operation 221, the second NE 110B processes, at operation 222, the second application data at the application protocol layer client 130B. The receipt of the second application layer data may update a state or data of the second application layer protocol client. For example, when the client 130B is a BGP peer, the first application data received can update a state of the BGP session between peer 130A and peer 130B and/or update BGP routing tables stored at the NE 110B.

The embodiments described herein enable a higher-level network layer client (e.g., application layer client 130B) to maintain communication with another client (e.g., another application layer client 130A) even when a transport protocol connection is lost between proxy NEs. For example, when the application layer is BGP, a BGP session can be maintained for a period of time even if an inner TCP connection (in the network 105) is lost. The use of the first proxy NE 120A and the second proxy NE 120B to separate the BGP sessions from the TCP connection that traverses the unreliable network allows each one of the BGP peers to link the BGP session with a reliable TCP connection (e.g., the TCP connection in the network 103A and the TCP session in the network 103B). This has the advantage of avoiding any state loss, or avoiding the need for retransmitting the BGP routing information from one peer to another, when the connection loss is temporary in the network 105.

Figure 2C:
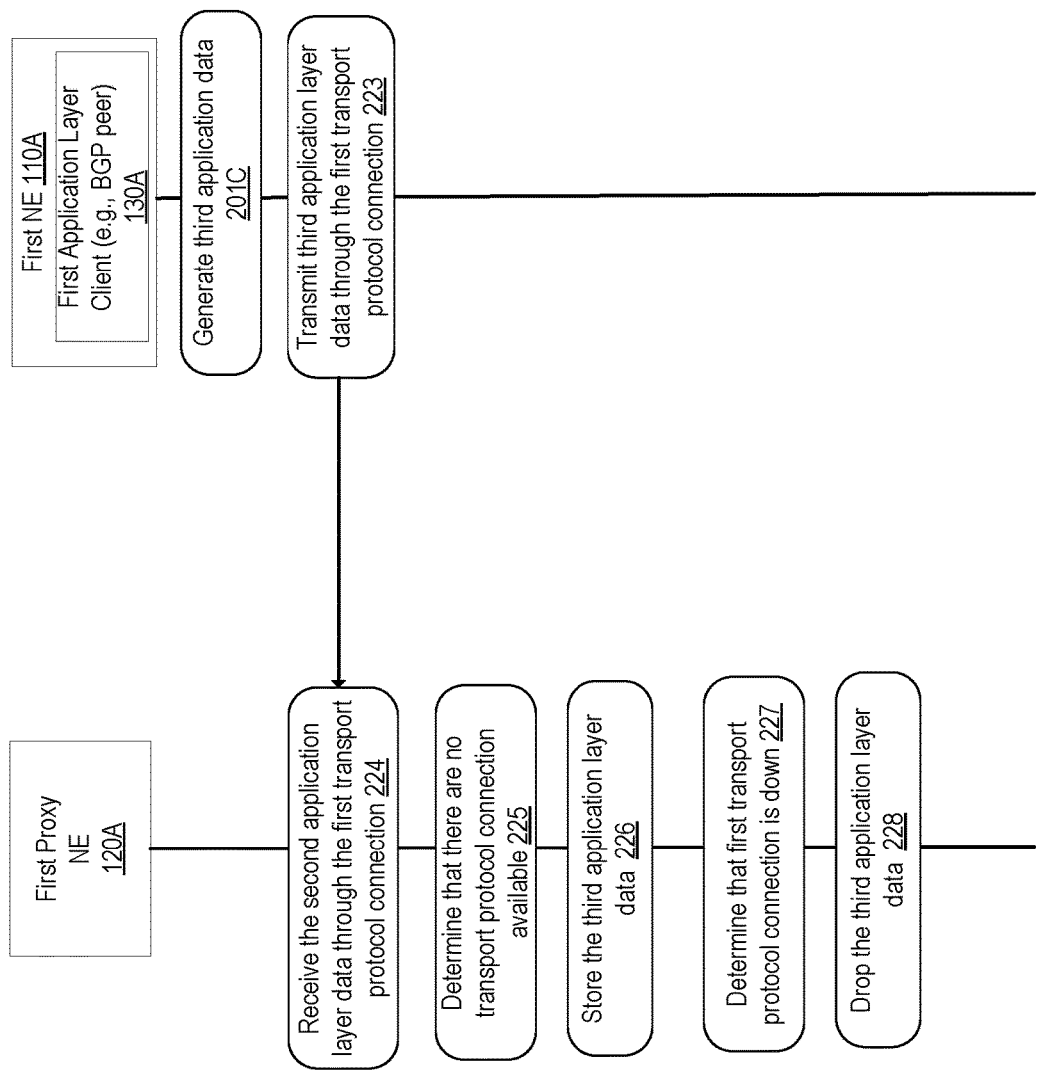
FIG. 2C illustrates a block diagram of operations for transmitting application layer data through transport protocol proxies according to some embodiments.

FIG. 2C illustrates a block diagram of operations for transmitting application layer data through transport protocol proxies according to some embodiments. At operation 201C, the first NE 110A generates third application layer data. The third application layer data is generated by the first application layer client (e.g., BGP peer). In some embodiments, the third application layer data can be part of an application layer session established between the first application layer protocol clients 130A-B. In some embodiments, the second application layer data can be a BGP message (which can also be referred to as a BGP packet). For example, the first application layer data can be an OPEN, UPDATE, NOTIFICATION, or KEEPALIVE message of the BGP protocol. The BGP message can be part of the same BGP session as the first application data generated at operation 201A and the second application data generated at operation 201B.

The application layer client 130A is operative to transmit, at operation 223, the third application layer data through the first transport protocol connection (that was established at operation 202). The application layer client 130A may keep session data and/or other types of data related to the communication between the client 130B and the client 130A. For example, when the clients 130A-B are BGP peers, each one may store session state related to the BGP session established between the two peers as well as BGP routing tables.

At operation 223, the first NE 110A transmits the third application data through the first transport protocol connection. The first proxy NE 120A receives, at operation 224, from the first NE 110A, through the first transport protocol connection, the third application layer data. The third application layer data is received within the transport protocol packets of the first transport protocol connection. The third application layer data is destined to the second NE 110B that is remote from the first network element.

At operation 225, the first proxy NE 120A determines that there are no transport protocol connections established for transmitting the second application layer data. For example, the third transport protocol connection may have been lost (due to failure in the network 105). Upon determining that there are no connections, the proxy NE 120A stores, at operation 226, the third application layer data. Instead of terminating the transport protocol connection established with NE 110A, which would cause the application layer session to be terminated, the proxy NE 120A buffers the third application layer data received to be transmitted through another transport protocol connection towards the NE 110B.

At operation 227, the first proxy NE 120A determines that the first transport protocol connection goes down prior to a fourth transport protocol connection is established towards the second network device. Upon determining that the first transport protocol connection is down (e.g., timeout of a BGP session, or failure at the network 103A, etc.), the first proxy NE 120A drops the third application layer data at operation 228 without transmitting the third application layer data towards the second network element.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Figure 3A:
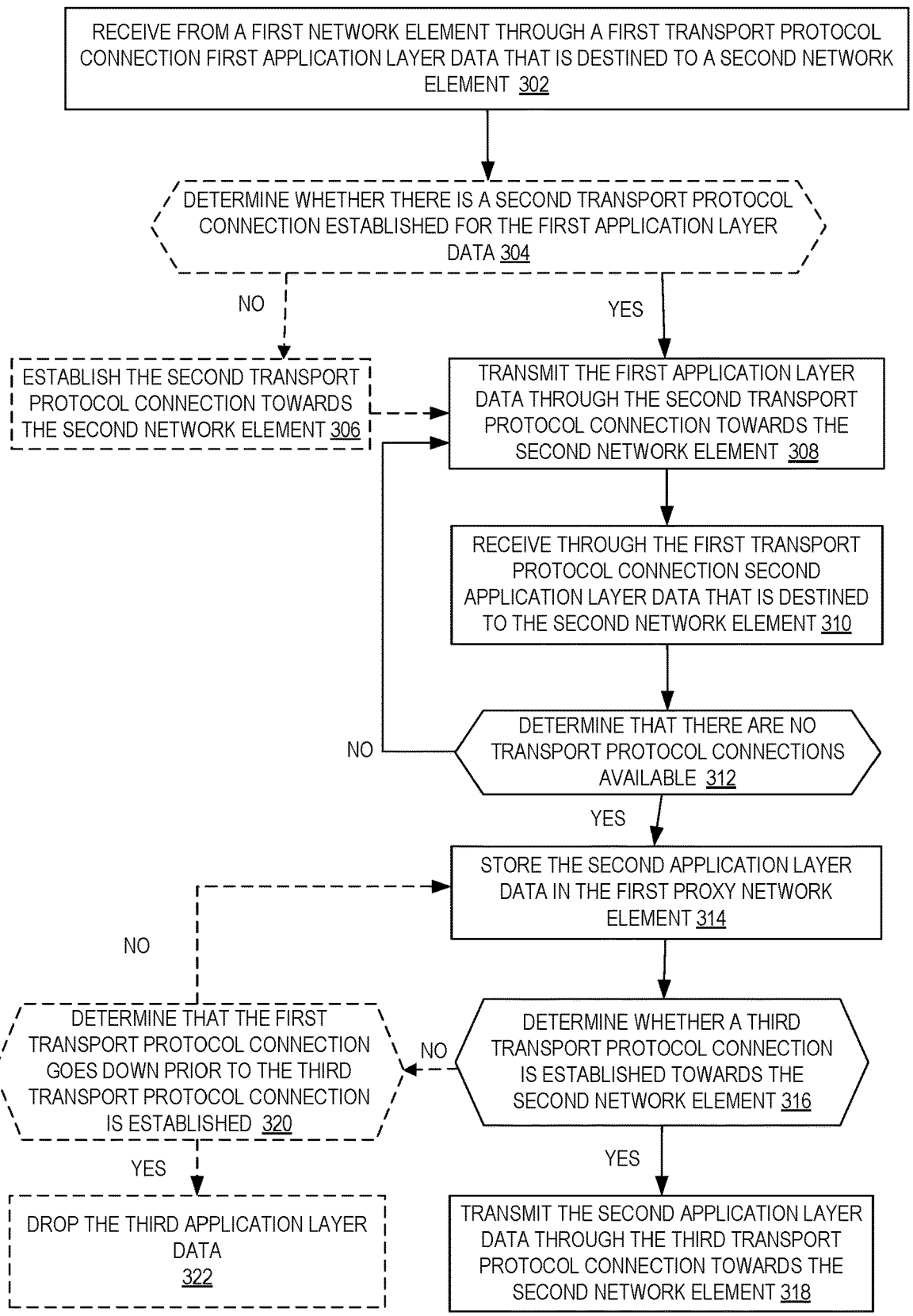
FIG. 3A illustrates a flow diagram of exemplary operations performed for enabling reliable application layer protocol communication through unreliable transport protocol connections according to some embodiments.

FIG. 3A illustrates a flow diagram of exemplary operations performed for enabling reliable application layer protocol communication through unreliable transport protocol connections, according to some embodiments.

At operation 302, the first proxy NE 120A receives from the first NE 110A through a first transport protocol connection first application layer data. The first application layer data is destined to the second NE 110B that is remote from the first network element.

The first application layer data was generated by a first application layer client (e.g., BGP peer) in the first NE 110A. In some embodiments, the first application layer data can be a network resource (e.g., XML, HTML, image, media file, etc.). In some embodiments, the first application layer data can include one or more messages of a routing protocol (e.g., BGP message(s) which can also be referred to as BGP packet(s)). In some embodiments, the first application layer data can be associated with a session of the application layer protocol (e.g., a BGP session).

The first application layer date is received through the first transport protocol connection between the first NE 110A and the proxy NE 120A. In some embodiments, establishing the transport protocol connection may include the exchange of one or more transport protocol messages or packets between NE 110A and proxy NE 120A and can be referred to as a handshake (e.g., TCP handshake). The proxy NE 120A can be a direct (or explicit) proxy or a transparent proxy for the NE 110A. When the proxy NE 120A is a direct proxy, the transport connection between NE 110A and proxy NE 120A is established with the IP address of NE 110A and the IP address of proxy NE 120A. In these embodiments, the NE 110A is configured to transmit all application layer data to the proxy NE 120A. In other embodiments, the proxy NE 120A is a transparent proxy and NE 110A is unaware that application layer data is intercepted by this proxy instead of being transmitted to NE 110B. In this embodiment, the transport protocol connection is established with the IP address of the NE 110A and the IP address of the NE 110B. However, instead of being transmitted to the NE 110B through a direct transport protocol connection, the application layer data is sent to the first proxy NE 120A.

The flow of operations then moves to operation 304. In some embodiments, upon receipt of the first application layer data the proxy NE 120A determines whether there is a second transport protocol connection established for the first application layer data. If there's a connection that matches the received packets including the application layer data, the application layer data is piped the existing connection. Thus, a match operation is performed at the proxy NE 120A on the source and destination addresses and ports and the transport protocol of the application layer data to determine how to forward this data. If there is no second transport protocol connection established, the flow of operations moves to operation 306. At operation 306, the proxy NE 120A establishes the second transport protocol connection towards the second NE 110B. The flow then moves from operation 306 to operation 308. In other embodiments, the second transport protocol connection may already have been established. In this case, the flow of operations moves to operation 308. At operation 308, the first proxy NE 120A transmits the first application data through the second transport protocol connection.

The second proxy NE 120B receives from the first proxy NE 120A, through the second transport protocol connection, the first application layer data. The proxy NE 120B is the endpoint of the second transport protocol connection. The proxy NE 120B retrieves the first application layer data from transport protocol packets. The transport protocol packets were received through the second transport protocol connection between the first proxy NE 120A and the second proxy NE 120B. The proxy NE 120B determines that the application layer data is to be transmitted through a fourth transport protocol connection towards the second NE 110B.

The flow of operations then moves to operation 310. At operation 310, the proxy NE 120A receives second application data. The second application layer data was generated by the first NE 110A after the first application layer data. In some embodiments, the second application layer data can be part of an application layer session established between the first application layer protocol clients 130A-B. In some embodiments, the second application layer data can be a BGP message (which can also be referred to as a BGP packet). For example, the first application layer data can be an OPEN, UPDATE, NOTIFICATION, or KEEPALIVE message of the BGP protocol. The BGP message can be part of the same BGP session as the first application data.

The flow of operations then moves to operation 312. At operation 312, the first proxy NE 120A determines that there are no transport protocol connections established for transmitting the second application layer data. For example, the second transport protocol connection may have been lost (due to failure in the network 105). If it is determined that there is a connection established for transmitting the application layer data (e.g., there is an existing TCP connection for the BGP session), the flow of operations moves to operation 308, and the second application layer data is transmitted to the second proxy NE 120B. Upon determining that there are no connections, the flow of operations moves to operation 314. At operation 314, the proxy NE 120A stores the second application layer data. Instead of terminating the transport protocol connection established with NE 110A, which would cause the application layer session to be terminated, the proxy NE 120A buffers the second application layer data received to be transmitted through another transport protocol connection towards the NE 110B.

The first proxy NE 120A establishes a third transport protocol connection (e.g., TCP connection) with the proxy NE 120B. At operation 316, the proxy NE 120A determines whether the third transport protocol connection is established. Upon determining that the third transport protocol connection is established, the flow of operations moves to operation 318, at which the first proxy NE 120A transmits the second application data through the third transport protocol connection.

In some embodiments, the proxy NE 120A may determine, at operation 320, whether the first transport protocol connection with the NE 110A is still up. Upon determining that the first transport protocol is down, the proxy NE 120A may delete, at operation 322, the stored application layer data for the application layer session associated with that connection without transmitting the application layer data towards NE 110B. In some embodiments, the first transport protocol connection can be terminated as a result of the application layer session being terminated. For example, the transport protocol connection can be terminated upon determining that a BGP keepalive packet was not received from a BGP peer before a predetermined period of time.

The embodiments described herein enable an application layer client 130B to maintain communication with another application layer client 130A even when a transport protocol connection is lost between proxy NEs. For example, when the application layer is BGP, a BGP session can be maintained for a period of time even if an inner TCP connection (in the network 105) is lost. The use of the first proxy NE 120A and the second proxy NE 120B to separate the BGP sessions from the TCP connection that traverses the unreliable network allows each one of the BGP peers to link the BGP session with a reliable TCP connection (e.g., the TCP connection in the network 103A and the TCP connection in the network 103B). This has the advantage of avoiding any state loss, avoiding the need for retransmitting BGP routing information from one peer to another, when the connection loss is temporary in the network 105.

FIG. 3B illustrates a flow diagram of exemplary operations 301 performed for establishing a first transport protocol connection towards the second network element, according to some embodiments. In some embodiments, establishing a first transport protocol connection may include the exchange of one or more transport protocol messages between the first NE 110A and the first proxy NE 120A. In some embodiments, the first proxy NE 120A can be a direct proxy. When the first proxy NE 120A is a direct proxy, establishing the first transport protocol connection is performed (operation 332) between the first NE 110A and the first proxy NE 120A with the IP address of the first network element and the IP address of the first proxy network element.

In other embodiments, the first proxy NE 120A can be a transparent proxy. When the first proxy NE 120A is a transparent proxy, establishing the first transport protocol connection is performed (operation 334) with the IP address of the first NE 110A and the IP address of the second NE 110B. The transport protocol messages transmitted from the first NE 110A towards the second NE 110B are intercepted by the proxy NE 120A that acts on behalf of the NE 110A.

FIG. 3C illustrates a flow diagram of exemplary operations performed for establishing the second transport protocol connection towards the second network element, according to some embodiments. In some embodiments, establishing the second transport protocol connection may include the exchange of one or more transport protocol messages between the first proxy 120A and the second proxy NE 120B. In some embodiments, the second proxy NE 120B can be a direct proxy. When the second proxy NE 120B is a direct proxy, establishing the second transport protocol connection is performed (operation 336) between the first proxy NE 120A and the second proxy NE 120B with the IP address of the first proxy NE 120A and the IP address of the second proxy NE 120B.

In other embodiments, the second proxy NE 120B can be a transparent proxy. When the second proxy network element is a transparent proxy, establishing the second transport protocol connection is performed (operation 338) with the IP address of the first proxy NE 120A and the IP address of the second NE 110B. The transport protocol messages transmitted from the first proxy NE 120A towards the second NE 110B are intercepted by the proxy NE 120B that acts on behalf of the NE 110B.

Figure 3D:
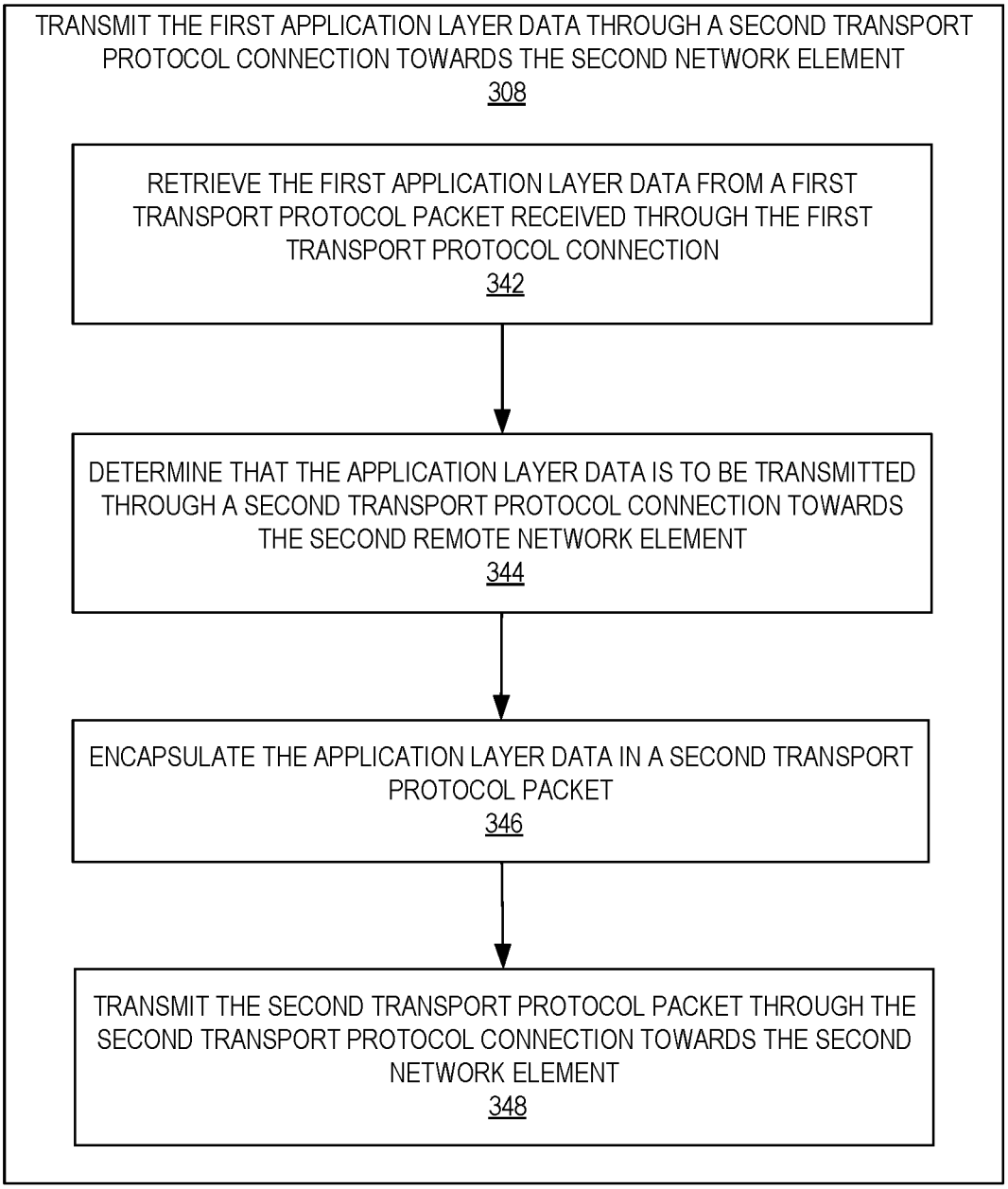
FIG. 3D illustrates a flow diagram of exemplary operations performed for transmitting the application layer data through a second transport protocol connection, according to some embodiments.

FIG. 3D illustrates a flow diagram of exemplary operations performed for transmitting the application layer data through a second transport protocol connection, according to some embodiments. At operation 342, the proxy NE 120A retrieves the first application layer data from a first transport protocol packet (e.g., a first TCP packet). The first transport protocol packet was received through the first transport protocol connection between the first NE 110A and the first proxy NE 120A. The flow of operations then moves to operation 344. At operation 344, the proxy NE 120A determines that the application layer data is to be transmitted through a second transport protocol connection towards the second NE 110B. This determination can be performed based on routing table entries for the IP address of the first NE 110A. When there is a connection that matches the received packets including the application layer data, the application layer data is piped the existing connection. Thus, a match operation is performed at the proxy NE 120A on the source and destination addresses and ports and the transport protocol of the application layer data to determine how to forward this data. The flow of operations then moves to operation 346, at which the proxy NE 120A encapsulates the application layer data in a second transport protocol packet and transmits, at operation 348, this second packet to through the second transport protocol connection towards the second NE 110B. While the embodiments herein as described with respect to a packet of the transport protocol, in some embodiments, multiple packets of the transport protocol can be received and/or transmitted.

Figure 3E:
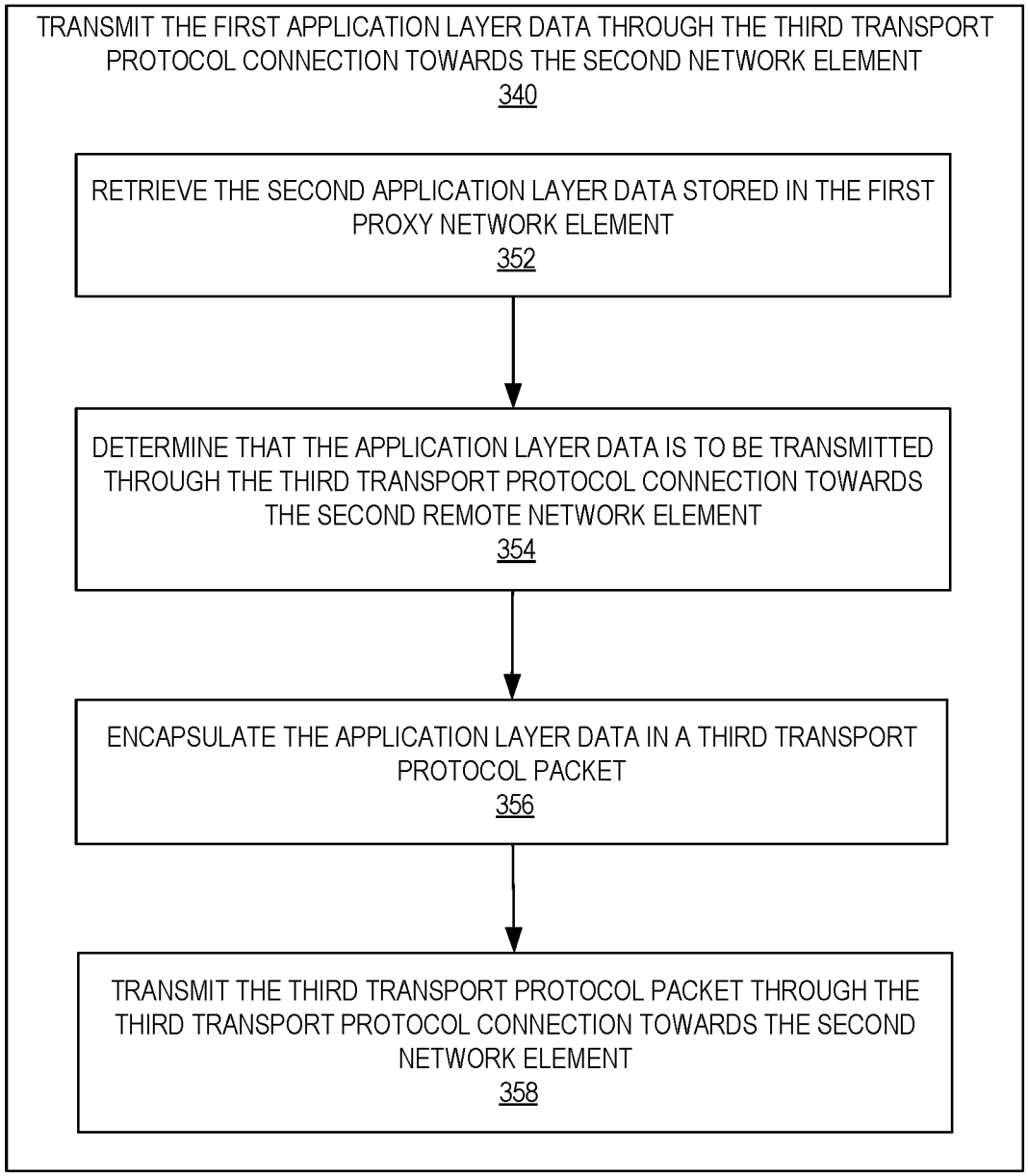
FIG. 3E illustrates a flow diagram of exemplary operations performed for transmitting stored application layer data through the third transport protocol connection, according to some embodiments.

FIG. 3E illustrates a flow diagram of exemplary operations performed for transmitting stored application layer data through the third transport protocol connection, according to some embodiments. The operations of FIG. 3D can be performed when a second transport protocol connection between the first proxy NE 120A and the second proxy NE 120B has been lost and the first proxy NE 120A stores transport protocol packets received from NE 110A that include application layer data. The proxy NE 120A reestablishes a third transport protocol connection for transmitting the application layer data and performs operation 340.

At operation 352, the proxy NE 120A retrieves the stored first application layer data. The application layer data was received in one or more transport protocol packets (e.g., TCP packets) through the first transport protocol connection between NE 110A and the proxy NE 120A. For example, the application layer data can be stored in a buffer in the proxy NE 120A. The flow of operations then moves to operation 354. At operation 354, the proxy NE 120A determines that the application layer data is to be transmitted through the third transport protocol connection towards the second NE 110B. This determination can be performed based on routing table entries for the IP address of the first NE 110A. The flow of operations then moves to operation 356, at which the proxy NE 120A encapsulates the application layer data in a third transport protocol packet and transmits, at operation 358, this third packet through the third transport protocol connection towards the second NE 110B.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Figure 4A:
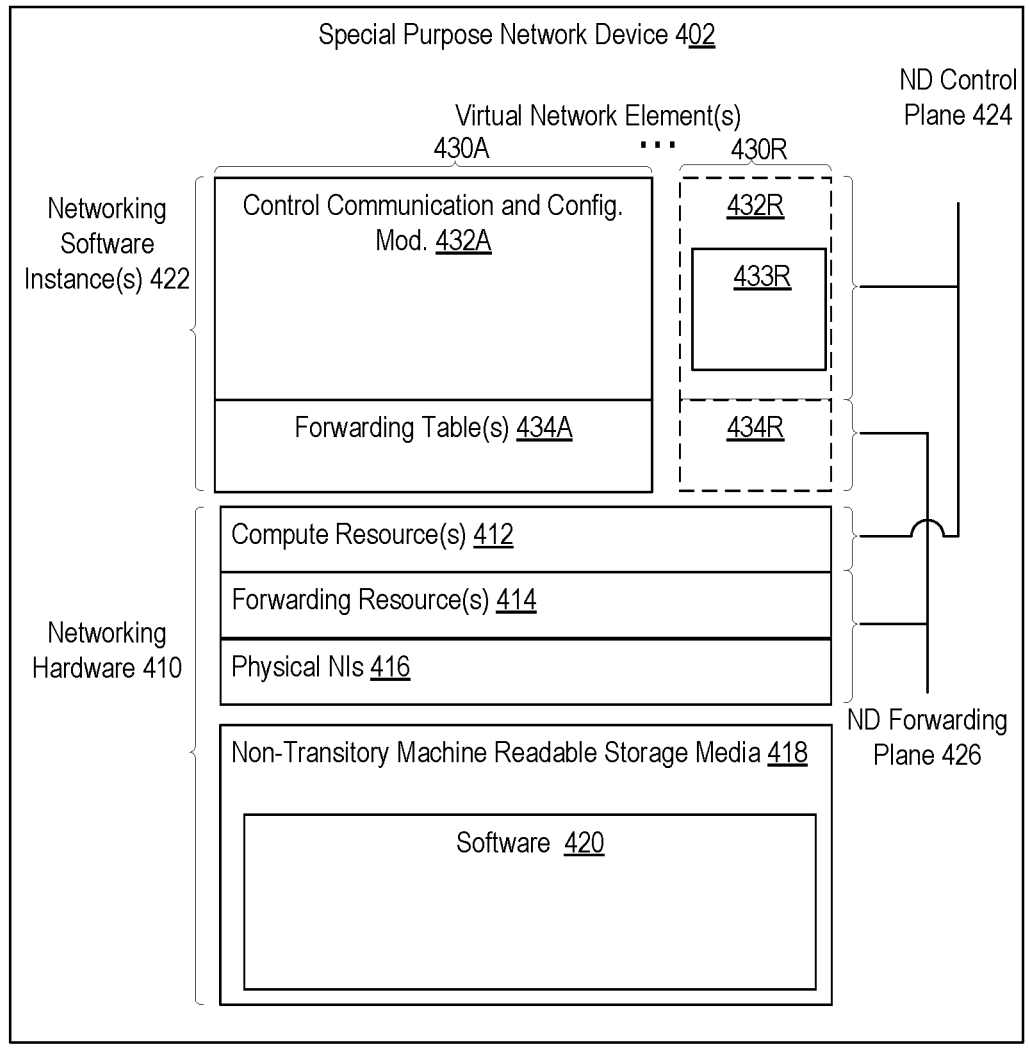
FIG. 4A illustrates a block diagram of an exemplary special-purpose network device that uses custom application-specific integrated-circuits (ASICs) and a special-purpose operating system (OS), according to some embodiments.
Figure 4B:
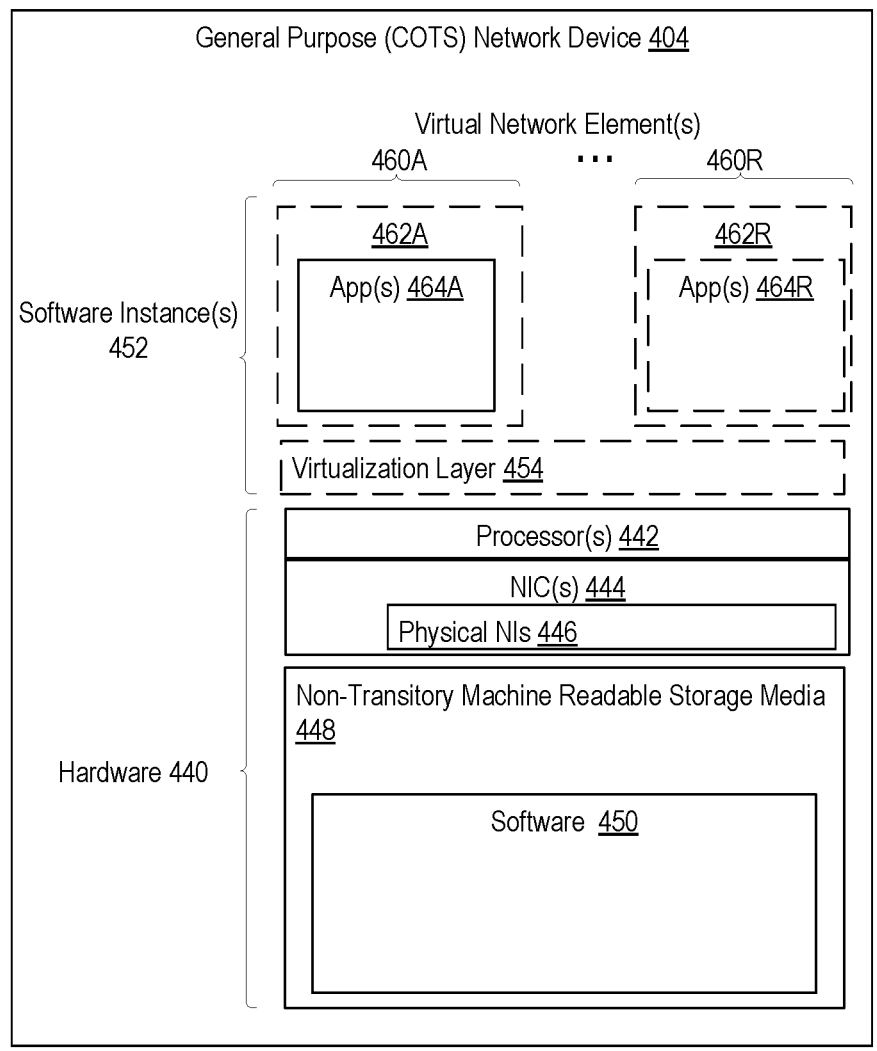
FIG. 4B illustrates a block diagram of an exemplary general-purpose network device 404 that uses common off-the-shelf (COTS) processors and a standard OS, according to some embodiments.

FIG. 4A illustrates a block diagram of an exemplary special-purpose network device 402 that uses custom application-specific integrated-circuits (ASICs) and a special-purpose operating system (OS). FIG. 4B illustrates a block diagram of an exemplary general-purpose network device 404 that uses common off-the-shelf (COTS) processors and a standard OS.

The special-purpose network device 402 includes networking hardware 410 comprising a set of one or more processor(s) 412, forwarding resource(s) 414 (which typically include one or more ASICs and/or network processors), and physical network interfaces (NIs) 416, as well as non-transitory machine-readable storage media 418 having stored therein networking software 420. During operation, the networking software 420 may be executed by the networking hardware 410 to instantiate a set of one or more networking software instance(s) 422. Each of the networking software instance(s) 422, and that part of the networking hardware 410 that executes that network software instance, form a separate network element 430A-R. Each of the network element(s) (NEs) 430A-R includes a control communication and configuration module 432A-R and forwarding table(s) 434A-R, such that a given network element (e.g., 430A) includes the control communication and configuration module (e.g., 432A), a set of one or more forwarding table(s) (e.g., 434A), and that portion of the networking hardware 410 that executes the virtual network element (e.g., 430A).

The special-purpose network device 402 is often physically and/or logically considered to include: 1) a ND control plane 424 comprising the processor(s) 412 that executes the control communication and configuration module(s) 432A-R; and 2) a ND forwarding plane 426 comprising the forwarding resource(s) 414 that utilize the forwarding table(s) 434A-R and the physical NIs 416. By way of example, where the ND is a router (or is implementing routing functionality), the ND control plane 424 (the processor(s) 412 executing the control communication and configuration module(s) 432A-R) is typically responsible for participating in controlling how data (e.g., packets) is to be routed (e.g., the next hop for the data and the outgoing physical NI for that data) and storing that routing information in the forwarding table(s) 434A-R, and the ND forwarding plane 426 is responsible for receiving that data on the physical NIs 416 and forwarding that data out the appropriate ones of the physical NIs 416 based on the forwarding table(s) 434A-R.

Returning to FIG. 4B, the general-purpose network device 404 includes hardware 440 comprising a set of one or more processor(s) 442 (which are often COTS processors) and physical NIs 446, as well as non-transitory machine-readable storage media 448 having stored therein software 450. During operation, the processor(s) 442 execute the software 450 to instantiate one or more sets of one or more applications 464A-R. While one embodiment does not implement virtualization, alternative embodiments may use different forms of virtualization. For example, in one such alternative embodiment the virtualization layer 454 represents the kernel of an operating system (or a shim executing on a base operating system) that allows for the creation of multiple instances 462A-R called software containers that may each be used to execute one (or more) of the sets of applications 464A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 454 represents a hypervisor (sometimes referred to as a virtual machine monitor (VMM)) or a hypervisor executing on top of a host operating system, and each of the sets of applications 464A-R is run on top of a guest operating system within an instance 462A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 440, directly on a hypervisor (in which case the unikernel is sometimes described as running within a LibOS virtual machine), or in a software container, embodiments can be implemented fully with unikernels running directly on a hypervisor represented by virtualization layer 454, unikernels running within software containers represented by instances 462A-R, or as a combination of unikernels and the above-described techniques (e.g., unikernels and virtual machines both run directly on a hypervisor, unikernels and sets of applications that are run in different software containers).

The instantiation of the one or more sets of one or more applications 464A-R, as well as virtualization if implemented, are collectively referred to as software instance(s) 452. Each set of applications 464A-R, corresponding virtualization construct (e.g., instance 462A-R) if implemented, and that part of the hardware 440 that executes them (be it hardware dedicated to that execution and/or time slices of hardware temporally shared), forms a separate network element(s) 460A-R.

The multiple network elements described herein with respect to FIGS. 1-3E can be implemented as the network elements of FIG. 4A or 4B.

The network element(s) 460A-R perform similar functionality to the network element(s) 430A-R—e.g., similar to the control communication and configuration module(s) 432A and forwarding table(s) 434A (this virtualization of the hardware 440 is sometimes referred to as network function virtualization (NFV)).

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method comprising:
    establishing a first transport protocol connection between a first proxy network element and a second proxy network element;
    receiving, at the first proxy network element from a first Border Gateway Protocol (BGP) client, first BGP data destined to a second BGP client that is connected to the second proxy network element;
    transmitting the first BGP data to the second proxy network element through the first transport protocol connection for delivery to the second BGP client;
    receiving, at the first proxy network element from the first BGP client, second BGP data destined to the second BGP client;
    determining that the first transport protocol connection is down, and responsive to this determination, storing the second BGP data at the first proxy network element;
    establishing a second transport protocol connection between the first proxy network element and the second proxy network element; and
    transmitting the second BGP data to the second proxy network element through the second transport protocol connection for delivery to the second BGP client.

2. The method of claim 1, further comprising:
    receiving, at the first proxy network element from the first BGP client, third BGP data that is destined to the second BGP client;
    determining that the second transport protocol connection is down, and responsive to this determination, storing the third BGP data at the first proxy network element:
    determining that a connection between the first proxy network element and the first BGP client has gone down prior to a third transport protocol connection between the first proxy network element and the second proxy network element being established, and responsive to this determination, dropping the third BGP data.

3. The method of claim 1, wherein the establishing the first transport protocol connection between the first proxy network element and the second proxy network element is responsive to receiving the first BGP data and a determination that no transport protocol connection is established towards the second BGP client.

4. The method of claim 1, wherein the first transport protocol connection and the second transport protocol connection are Transport Control Protocol (TCP) connections.

5. The method of claim 1, wherein the first transport protocol connection and the second transport protocol connection are established through a wide area network over unreliable network links.

6. The method of claim 1, wherein the first proxy network element and the first BGP client are part of a first data center, and wherein the second proxy network element and the second BGP client are part of a second data center.

7. The method of claim 1, wherein the first BGP data is received from the first proxy network element over a third transport protocol connection that is over a reliable network link.

8. A non-transitory machine-readable storage medium that provides instructions that, if executed by a processor, will cause said processor to perform operations comprising:
    establishing a first transport protocol connection between a first proxy network element and a second proxy network element;
    receiving, at the first proxy network element from a first Border Gateway Protocol (BGP) client, first BGP data destined to a second BGP client that is connected to the second proxy network element;
    transmitting the first BGP data to the second proxy network element through the first transport protocol connection for delivery to the second BGP client;
    receiving, at the first proxy network element from the first BGP client, second BGP data destined to the second BGP client;
    determining that the first transport protocol connection is down, and responsive to this determination, storing the second BGP data at the first proxy network element;
    establishing a second transport protocol connection between the first proxy network element and the second proxy network element; and
    transmitting the second BGP data to the second proxy network element through the second transport protocol connection for delivery to the second BGP client.

9. The non-transitory machine-readable storage medium of claim 8, wherein the operations further comprise:
    receiving, at the first proxy network element from the first BGP client, third BGP data that is destined to the second BGP client;
    determining that the second transport protocol connection is down, and responsive to this determination, storing the third BGP data at the first proxy network element;
    determining that a connection between the first proxy network element and the first BGP client has gone down prior to a third transport protocol connection between the first proxy network element and the second proxy network element being established, and responsive to this determination, dropping the third BGP data.

10. The non-transitory machine-readable storage medium of claim 8, wherein the establishing the first transport protocol connection between the first proxy network element and the second proxy network element is responsive to receiving the first BGP data and a determination that no transport protocol connection is established towards the second BGP client.

11. The non-transitory machine-readable storage medium of claim 8, wherein the first transport protocol connection and the second transport protocol connection are Transport Control Protocol (TCP) connections.

12. The non-transitory machine-readable storage medium of claim 8, wherein the first transport protocol connection and the second transport protocol connection are established through a wide area network over unreliable network links.

13. The non-transitory machine-readable storage medium of claim 8, wherein the first proxy network element and the first BGP client are part of a first data center, and wherein the second proxy network element and the second BGP client are part of a second data center.

14. The non-transitory machine-readable storage medium of claim 8, wherein the first BGP data is received from the first proxy network element over a third transport protocol connection that is over a reliable network link.

15. A first proxy network element, comprising:
   a processor; and
   a non-transitory machine-readable storage medium that provides instructions that, if executed by the processor, will cause the server to perform operations including:
   establishing a first transport protocol connection between the first proxy network element and a second proxy network element;
   receiving, at the first proxy network element from a first Border Gateway Protocol (BGP) client, first BGP data destined to a second BGP client that is connected to the second proxy network element;
   transmitting the first BGP data to the second proxy network element through the first transport protocol connection for delivery to the second BGP client;
   receiving, at the first proxy network element from the first BGP client, second BGP data destined to the second BGP client;
   determining that the first transport protocol connection is down, and responsive to this determination, storing the second BGP data at the first proxy network element;
   establishing a second transport protocol connection between the first proxy network element and the second proxy network element; and
   transmitting the second BGP data to the second proxy network element through the second transport protocol connection for delivery to the second BGP client.

16. The first proxy network element of claim 15, wherein the operations further comprise:
   receiving, at the first proxy network element from the first BGP client, third BGP data that is destined to the second BGP client;
   determining that the second transport protocol connection is down, and responsive to this determination, storing the third BGP data at the first proxy network element;
   determining that a connection between the first proxy network element and the first BGP client has gone down prior to a third transport protocol connection between the first proxy network element and the second proxy network element being established, and responsive to this determination, dropping the third BGP data.

17. The first proxy network element of claim 15, wherein the establishing the first transport protocol connection between the first proxy network element and the second proxy network element is responsive to receiving the first BGP data and a determination that no transport protocol connection is established towards the second BGP client.

18. The first proxy network element of claim 15, wherein the first transport protocol connection and the second transport protocol connection are Transport Control Protocol (TCP) connections.

19. The first proxy network element of claim 15, wherein the first transport protocol connection and the second transport protocol connection are established through a wide area network over unreliable network links.

20. The first proxy network element of claim 15, wherein the first proxy network element and the first BGP client are part of a first data center, and wherein the second proxy network element and the second BGP client are part of a second data center.

21. The first proxy network element of claim 15, wherein the first BGP data is received from the first proxy network element over a third transport protocol connection that is over a reliable network link.

\* \* \* \* \*